United States Patent
Fujiwara et al.

(10) Patent No.: US 9,837,857 B2
(45) Date of Patent: Dec. 5, 2017

(54) RECTENNA

(71) Applicant: IHI AEROSPACE CO., LTD., Tokyo (JP)

(72) Inventors: Eiichiro Fujiwara, Tokyo (JP); Masaru Aoki, Asaka (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 1171 days.

(21) Appl. No.: 13/926,876

(22) Filed: Jun. 25, 2013

(65) Prior Publication Data

US 2014/0001876 A1    Jan. 2, 2014

(30) Foreign Application Priority Data

Jun. 29, 2012  (JP) .................................. 2012-146660

(51) Int. Cl.
*H02J 17/00*  (2006.01)
*H01Q 1/22*   (2006.01)
*H01Q 1/24*   (2006.01)

(52) U.S. Cl.
CPC ........... *H02J 17/00* (2013.01); *H01Q 1/2225* (2013.01); *H01Q 1/248* (2013.01)

(58) Field of Classification Search
CPC .......... H02J 17/00; H02J 5/005; H01Q 1/248; H01Q 1/2225; H04B 1/18
USPC .................................. 455/550.1, 561, 562.1
See application file for complete search history.

(56) References Cited

U.S. PATENT DOCUMENTS

| | | | | |
|---|---|---|---|---|
| 5,260,701 A | * | 11/1993 | Guern | A61N 1/37223 340/10.34 |
| 5,598,169 A | * | 1/1997 | Drabeck | G01S 13/75 343/701 |
| 5,745,844 A | * | 4/1998 | Kromer | H03G 3/3052 330/298 |
| 8,228,194 B2 | * | 7/2012 | Mickle | G06K 7/0008 340/538.14 |
| 8,432,234 B2 | * | 4/2013 | Manssen | H03H 7/40 333/17.3 |

(Continued)

FOREIGN PATENT DOCUMENTS

| | | |
|---|---|---|
| JP | 04-147082 A | 5/1992 |
| JP | 06-347544 A | 12/1994 |

OTHER PUBLICATIONS

Japanese-Language Office Action for JP 2012-146660, mailed Mar. 9, 2016.

*Primary Examiner* — Daniel Kessie

(74) *Attorney, Agent, or Firm* — Marshall, Gerstein & Borun LLP

(57) ABSTRACT

A rectenna includes an antenna configured to receive a radio wave, a rectifier circuit configured to rectify the radio wave received by the antenna, a transmission line connected to the antenna and the rectifier circuit, and a modulation input circuit including a variable capacitance element. The variable capacitance element is connected at one end to a portion of the transmission line between an antenna connecting portion at which the antenna is connected to the transmission line and a rectifier circuit connecting portion at which the rectifier circuit is connected to the transmission line, and is configured such that the capacitance thereof varies in accordance with the voltage of a modulated signal wave input to the other end of the variable capacitance element.

1 Claim, 6 Drawing Sheets

(56) References Cited

U.S. PATENT DOCUMENTS

| | | | | |
|---|---|---|---|---|
| 2002/0044092 A1* | 4/2002 | Kushihi | ............... | H01Q 1/243 343/702 |
| 2003/0231074 A1* | 12/2003 | Fujidai | ................ | H03B 5/18 331/177 V |
| 2010/0291946 A1* | 11/2010 | Yamakawa | ......... | H03H 7/0153 455/454 |
| 2011/0134003 A1* | 6/2011 | Okada | ............... | H01Q 9/0407 343/745 |

* cited by examiner

RECTENNA

BACKGROUND OF THE INVENTION

Field of the Invention

The present invention relates to rectennas, and more particularly, to a rectenna for rectifying and converting radio waves into electrical power.

Description of the Related Art

Rectenna is a device that converts microwaves received by its antenna into direct current to obtain electrical power. Such rectennas are expected to be used for wireless power transmission, as in space solar power generation systems in which electricity is generated with the use of solar light collected by solar panels mounted on an artificial satellite and is transmitted to the ground in the form of microwaves, which are received on the ground and converted into electrical power, as well as in wireless power supplies for feeding electrical power to electric vehicles, mobile terminals and the like.

In recent years, rectennas have come to be used in RFID (Radio Frequency Identification) chips for the purpose of rectification. An RFID chip with a rectenna requires no battery cell to be mounted thereon and can obtain electrical power necessary for its operation by rectifying part of the carrier wave received by the antenna. Exemplary operation of such an RFID chip is schematically illustrated in FIG. 4. A carrier wave received by an antenna 102 passes through a transmission line 104 to a terminal to which the switching element of a switch 106 is connected. The switch 106 has three connection terminals, that is, a terminal 106a which opens the circuit when the switching element is connected thereto, a terminal 106b connected to a resistor 108, and a terminal 106c which short-circuits the circuit when the switching element is connected thereto.

The RFID chip configured as described above is capable of transmitting information written in a memory thereof as the position of the switch 106 is changed from one to another. When the switch 106 is connected to the terminal 106a so that the transmission line 104 may be open at its end opposite the antenna 102 as shown in FIG. 5A, impedance mismatch is caused, with the result that the carrier wave is totally reflected back in phase with the carrier wave input to the transmission line 104. On the other hand, when the switch 106 is connected to the terminal 106b, as shown in FIG. 5B, so that the transmission line 104 may be terminated by the resistor 108 with an impedance equal to that of the transmission line 104, the carrier wave is not reflected at all. Further, when the switch 106 is connected to the terminal 106c to short-circuit the transmission line 104 as shown in FIG. 5C, impedance mismatch is caused and the carrier wave is totally reflected back such that the phase thereof is opposite to that of the carrier wave input to the transmission line 104. Thus, by selectively opening and short-circuiting the transmission line 104 at its end by the switch 106 and thereby modulating the phase of the signal, it is possible to transmit information stored in the RFID chip from the antenna 102 (Hideyuki NEBIYA, Kotomi UETAKE, and Masahide HAYAMA, "Passive Backscatter RFID System", Seminar at Tohoku Branch, the Institute of Electronics, Information and Communication Engineers, June 2002, pp. 1-3). With the configuration described above, the RFID chip requires no power supply, and also since a transmitter for outbound transmission of the information stored in the memory of the RFID chip is unnecessary, it is possible to realize a small-sized, batteryless RFID chip.

However, the technique disclosed in the above literature requires a physical space that allows the switch 106 to perform switching operation, and thus there is a limit on further reduction in size. Also, since the switch 106 is mechanically driven, deterioration in the switch 106 and like factors impose restrictions on durability.

SUMMARY OF THE INVENTION

The present invention was made to solve the above problem, and an object thereof is to provide a rectenna equipped with a transmitting function, reduced in size and having a prolonged life.

To achieve the object, the present invention provides a rectenna including: an antenna configured to receive a radio wave; a rectifier circuit configured to rectify the radio wave received by the antenna; a transmission line connected to the antenna and the rectifier circuit; and a modulation input circuit including a variable capacitance element, the variable capacitance element being connected at one end to a portion of the transmission line between an antenna connecting portion at which the antenna is connected to the transmission line and a rectifier circuit connecting portion at which the rectifier circuit is connected to the transmission line, and configured such that capacitance thereof varies in accordance with a voltage of a modulated signal wave input to the other end of the variable capacitance element.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the drawings.

Figure 1:
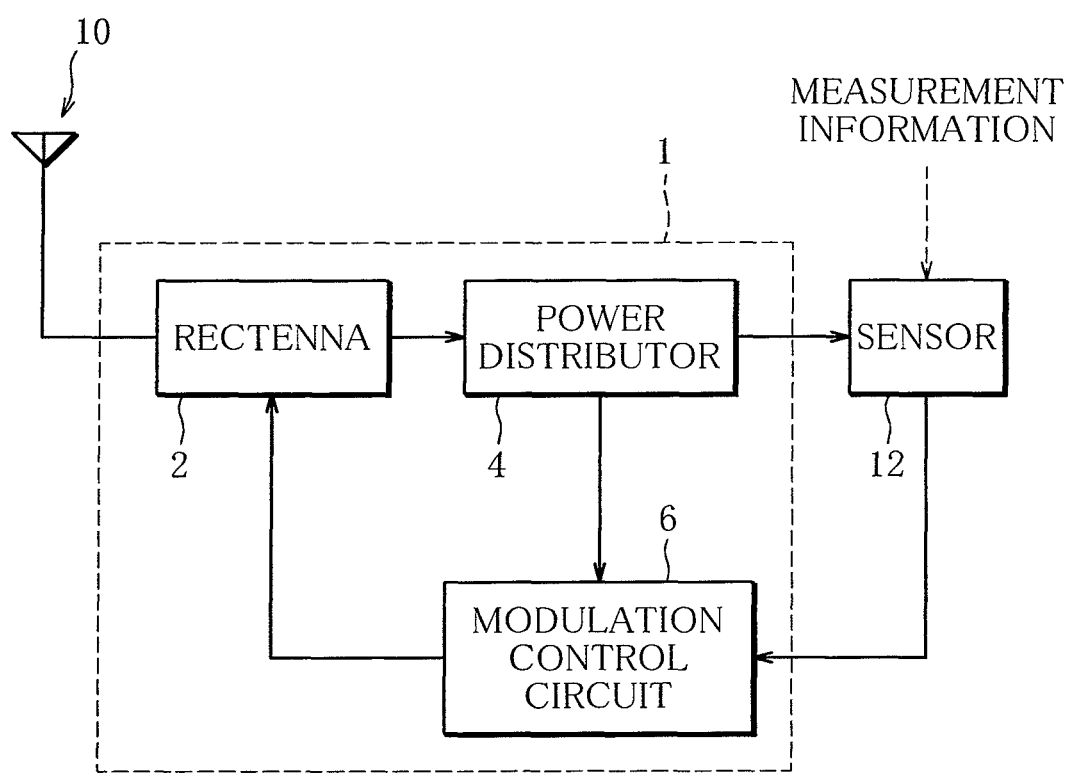
FIG. 1 schematically illustrates a high-frequency circuit provided with a rectenna according to the present invention.

FIG. 1 schematically illustrates a high-frequency circuit provided with a rectenna according to the present invention. The high-frequency circuit 1 includes a rectenna 2, an electrical power distributor 4, and a modulation control circuit 6. The rectenna 2, which is connected with an antenna 10, rectifies a microwave (hereinafter referred to as carrier wave) received by the antenna 10 to convert the received carrier wave into a direct current and supplies the direct current to the power distributor 4. The frequency band of the carrier wave received by the antenna 10 is, for example, 2.45 GHz band or 5.8 GHz band.

The power distributor 4 distributes the electrical power supplied thereto from the rectenna 2 to a sensor 12, which is connected to the high-frequency circuit 1, as well as to the modulation control circuit 6 connected to the power distributor 4 so that the modulation control circuit 6 and the sensor 12 can operate using the electrical power supplied thereto. The sensor 12 may be a vibration sensor, a response sensor or a strain sensor, for example, but the sensor to be used is not limited to these types and may be of various other types.

A signal indicative of measurement information acquired by the sensor 12 is input to the modulation control circuit 6. The modulation control circuit 6 modulates the input signal from the sensor 12 according to a predetermined modulation scheme and supplies the modulated signal to the rectenna 2. For example, the modulation control circuit 6 may modulate the input signal according to PSK (Phase-Shift Keying) modulation scheme. By changing the phase, amplitude or the like of the input signal with use of the modulation control circuit 6, it is possible to transmit various kinds of information from the antenna 10 to outside, as described later.

The modulated signal input to the rectenna 2 is transmitted from the antenna 10 by making use of a reflected wave of the carrier wave received by the antenna 10, as described later.

Figure 2:
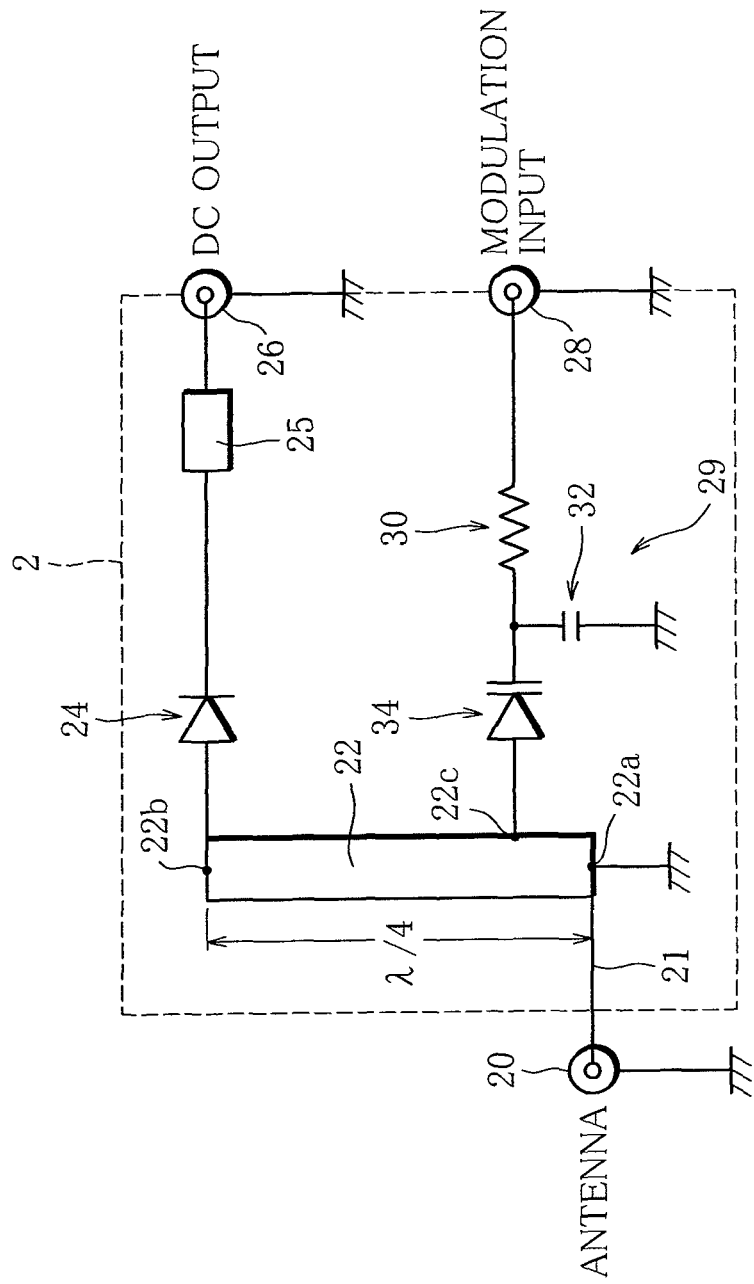
FIG. 2 is a circuit diagram of the rectenna shown in FIG. 1.

FIG. 2 is a circuit diagram showing details of the rectenna 2. An antenna terminal 20 is connected to the antenna 10 and is also connected, by a line 21, to an antenna connecting portion 22a forming one end of a stripline (transmission line) 22 as viewed in a longitudinal direction of the stripline 22. Also, a diode 24 is connected to a rectifier circuit connecting portion 22b forming the other end of the stripline 22 as viewed in the longitudinal direction of the stripline 22. An output filter 25 is connected between the diode 24 and an output terminal 26.

The carrier wave received by the antenna 10 propagates through the stripline 22 and is input to the diode 24 for rectification. The rectified direct current is supplied through the output filter 25 and the output terminal 26 to the power distributor 4.

The output filter 25 is provided to prevent the carrier wave input to the diode 24 from entering a direct current line (not shown) connected to the output terminal 26.

Provided that the wavelength of the fundamental of the carrier wave is 2, the length of the stripline 22 is equal to 214. The stripline 22 has such a length that when the carrier wave input from the antenna connecting portion 22a is reflected at the other end of the stripline 22 corresponding to the rectifier circuit connecting portion 22b, the reflected wave has an inverted phase, that is, a phase difference of 180°, with respect to the input carrier wave from the antenna 10 at the input end of the stripline 22 corresponding to the antenna connecting portion 22a. Thus, at the input end of the stripline 22 corresponding to the antenna connecting portion 22a, the carrier wave and the reflected wave, which are opposite in phase, cancel out each other. It is therefore possible to suppress radiation from the antenna 10 of the reflected wave that has been reflected at the other end of the stripline 22 corresponding to the rectifier circuit connecting portion 22b.

On the other hand, the signal wave modulated by the modulation control circuit 6 is input to the rectenna 2 via an input terminal 28. The input terminal 28 is connected to a modulation input circuit 29 which includes a resistor 30, a capacitor 32 and a variable capacitance diode (variable capacitance element) 34. The capacitor 32 is connected between the resistor 30 and the variable capacitance diode 34 and is grounded. The variable capacitance diode 34 is connected to the stripline 22, more specifically, to a portion 22c located between the antenna connecting portion 22a and the rectifier circuit connecting portion 22b. Since the variable capacitance diode 34 is connected to the stripline 22, the carrier wave is hindered from entering the modulation input circuit 29 from the stripline 22, whereby loss of the carrier wave propagating through the stripline 22 can be reduced to the lowest possible level.

The signal wave output from the sensor 12 and then modulated by the modulation control circuit 6 is supplied to the rectenna 2 through the input terminal 28. The modulated signal wave is input to the variable capacitance diode 34 via the resistor 30 and the capacitor 32. The variable capacitance diode 34 is connected to the stripline 22, more specifically, to the connecting portion 22c located between the antenna connecting portion 22a and the rectifier circuit connecting portion 22b.

As the modulated signal wave is input to the variable capacitance diode 34, the capacitance of the variable capacitance diode 34 varies in accordance with the voltage of the modulated signal wave, so that the impedance of the modulation input circuit 29 changes, causing impedance mismatch between the stripline 22 and the modulation input circuit 29. Consequently, the carrier wave input to the stripline 22 from the antenna connecting portion 22a is reflected at the connecting portion 22c. That is, the carrier wave is subjected to phase modulation (PSK) at the connecting portion 22c of the stripline 22, thus enabling outbound transmission of information from the antenna 10.

Figure 3:
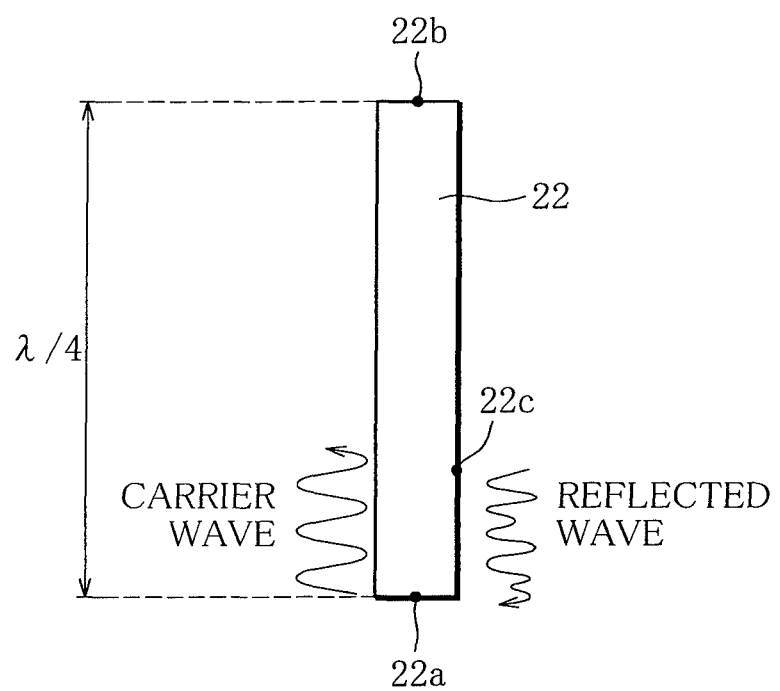
FIG. 3 exemplifies a carrier wave and a reflected wave on a stripline.
Figure 4:
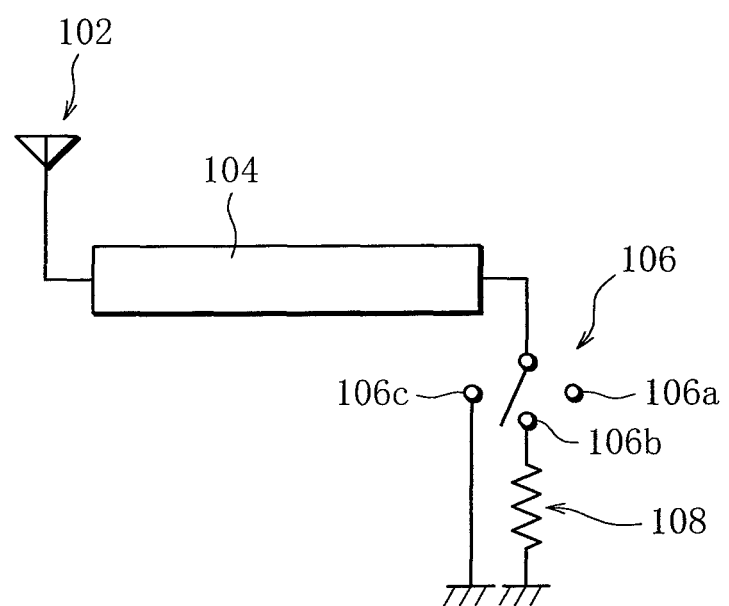
FIG. 4 illustrates exemplary operation of an RFID chip.
Figure 5A:
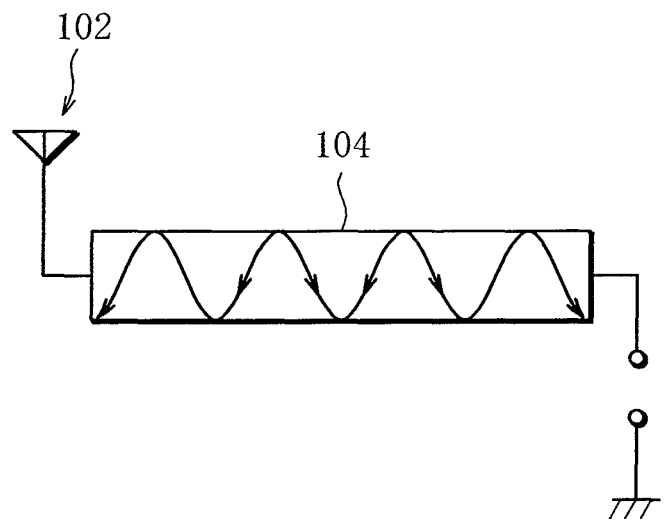
FIG. 5A illustrates an open state of the circuit shown in FIG. 4.
Figure 5B:
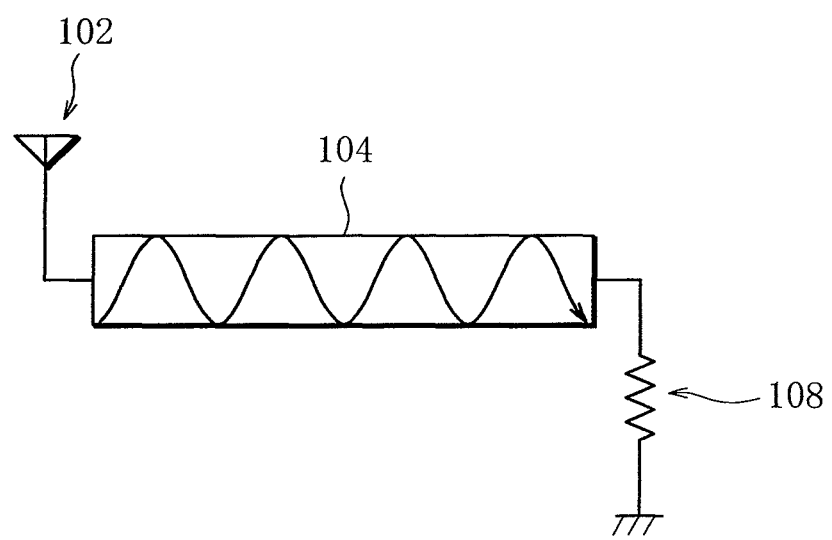
FIG. 5B illustrates a state of the circuit of FIG. 4 in which the circuit is connected to a resistor.
Figure 5C:
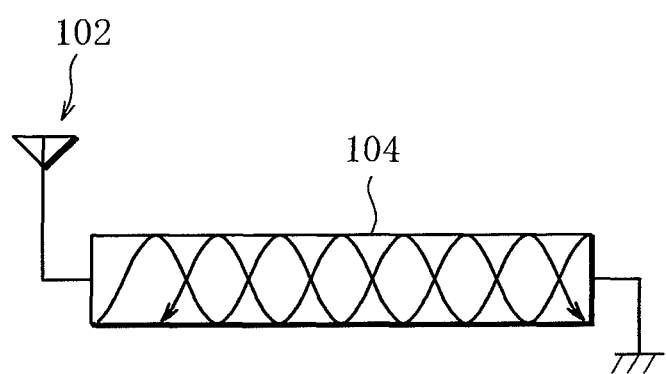
FIG. 5C illustrates a short-circuited state of the circuit of FIG. 4.

This will be explained in more detail with reference to FIG. 3. As shown in FIG. 3, the reflected wave generated at the connecting portion 22c is modulated in phase, and thus the phase of the reflected wave is not opposite to that of the carrier wave at the antenna connecting portion 22a, so that the reflected wave is not canceled out by the carrier wave. Accordingly, the reflected wave is propagated through the line 21 and transmitted to outside from the antenna 10. The signal wave from the sensor 12, which has been modulated and input through the input terminal 28, may be superimposed on the reflected wave so that the information acquired by the sensor 12 can be transmitted to outside via the antenna 10. Since a transmitter for transmitting the signal wave from the sensor 12 to outside through the antenna 10 is unnecessary, the rectenna 2 can be reduced in size. Also, since the carrier wave is caused to reflect by making use of change in the capacitance of the variable capacitance diode 34, it is not necessary to provide a switch for causing reflection of the carrier wave, making it possible to further reduce the size of the rectenna 2.

Thus, according to the embodiment, the variable capacitance diode 34 is connected to a portion of the stripline 22 between the antenna connecting portion 22a and the rectifier circuit connecting portion 22b.

As the modulated signal wave is input to the variable capacitance diode 34, the capacitance of the variable capacitance diode 34 varies in accordance with the voltage of the input signal wave, with the result that impedance mismatch occurs in the stripline 22, causing reflection of the carrier wave. That is to say, the carrier wave is modulated and sent out from the antenna 10. Thus, the modulated signal wave is superimposed on the reflected wave so that the information from the sensor 12 can be transmitted to outside via the antenna 10.

Accordingly, the rectenna 2 need not be provided with a transmitter for transmitting the signal wave from the sensor 12 to outside through the antenna 10, whereby the rectenna 2 can be reduced in size.

Also, in the circuitry of the rectenna 2, the reflected wave is continuously generated in the stripline 22 as long as the carrier wave is input from the antenna 10, and therefore, no mechanical switch is required, simplifying the circuit configuration and prolonging life.

Since a mechanical switch need not be provided as stated above, the size of the rectenna 2 can be further reduced. Also, electrical power for actuating such a mechanical switch is not required, so that the power consumption of the rectenna 2 can be kept low.

The length of the stripline 22 is equal to $\lambda/4$ of the wavelength of the fundamental of the carrier wave, and as long as the carrier wave is input to the stripline 22 from the antenna 10, the carrier wave can be caused to reflect at the connecting portion 22c connected with the variable capacitance diode 34. Consequently, the information from the sensor 12 can be superimposed on the reflected wave to be transmitted to outside from the antenna 10. Also, the same advantageous effects as those stated above can be obtained.

While the embodiment has been described above, it is to be noted that the present invention is not limited to the foregoing embodiment and may be modified in various ways without departing from the spirit and scope of the invention.

For example, in the above embodiment, the variable capacitance diode 34 is used to vary the impedance of the modulation input circuit 29, but the element to be used for that purpose is not particularly limited and any desired element may be used insofar as it is capable of varying the impedance of the modulation input circuit 29.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rectenna comprising:
    an antenna configured to receive a radio wave;
    a rectifier circuit configured to rectify the radio wave received by the antenna, the rectifier circuit including a diode that is coupled to a filter, the filter being coupled to a DC output;
    a transmission line connected to the antenna and the rectifier circuit; and having a length equal to ¼ of a wavelength of a fundamental of the radio wave received by the antenna;
    a modulation input circuit including a variable capacitance diode, the variable capacitance diode being connected at one end to a portion of the transmission line between an antenna connecting portion at which the antenna is connected to the transmission line and a rectifier circuit connecting portion at which the rectifier circuit is connected to the transmission line, and configured such that capacitance thereof varies in accordance with a voltage of a modulated signal wave input to the other end of the variable capacitance diode; and
    a capacitor connected to the modulation input circuit between the variable capacitance diode and a resistor, the resistor being connected to the modulation input circuit,
    wherein the variable capacitance diode has an anode directly connected to the transmission line thereby hindering a carrier wave on the transmission line from entering the modulation input circuit, which reduces loss of the carrier wave.

\* \* \* \* \*